United States Patent [19]

Oberle

[11] Patent Number: 4,762,748

[45] Date of Patent: Aug. 9, 1988

[54] MULTILAYER FILM WITH BETTER LAYER ADHESION

[75] Inventor: Timothy T. Oberle, Lyman, S.C.

[73] Assignee: W. R. Grace & Co., Duncan, S.C.

[21] Appl. No.: 880,257

[22] Filed: Jun. 30, 1986

[51] Int. Cl.$^4$ .............................................. B32B 27/00
[52] U.S. Cl. ..................................... 428/349; 428/35; 428/516; 428/520
[58] Field of Search ................ 428/516, 349, 35, 518, 428/343

[56] References Cited

U.S. PATENT DOCUMENTS 4,495,249 1/1985 Ohya et al. .......................... 428/516
4,615,926 10/1986 Hsu et al. ............................ 428/516

Primary Examiner—Edith Buffalow
Attorney, Agent, or Firm—John J. Toney; William D. Lee, Jr.; Mark B. Quait

[57] ABSTRACT

A pasteurizable and/or cook-in shrink film is provided with good interlaminar adhesion and good orientability, and characterized by the presence of ethylene alkyl acrylate copolymer in shrink and abuse layers, in adhesive layers, or both. An associated method for making the film is also provided that includes coextrusion of the multilayer film, optional irradiation, and orientation.

9 Claims, No Drawings

MULTILAYER FILM WITH BETTER LAYER ADHESION

BACKGROUND OF THE INVENTION

This invention relates generally to heat shrinkable, relatively gas impermeable, thermoplastic packaging film which can be heat sealed to itself to form a flexible package. The invention relates more particularly to bags of such film for food products in which the packaged product is submerged in heated water, or exposed to steam or dry air heat or autoclaved for a substantial period of time for pasteurizing or cooking, the bag structure being shrinkable and nondegradable under such conditions.

There is a need in the food packaging industry for a packaging film from which bags can be made which are of improved structural soundness such that they may be fully characterized as pasteruizable and/or cook-in. Further, it is desirable to have a precooked food product which is attractively packaged inside the film within which it was precooked.

The term "pasteurizable" as used herein is intended to refer to packaging material structurally capable of withstanding exposure to pasteurizing conditions while containing a food product. Many food products require pasteurization after they have been hermetically packaged to destroy harmful microbes which grow in the absence of air. Specific pasteurization requirements tend to vary by country; however, limiting conditions probably are submersion of the hermetically sealed product in water at 95° C. for 1 hour. Thus, for a bag to characterized as pasteurizable, structural integrity of the bag must be maintained during pasteurization, i.e. the bag must have superior high temperature seal strength and must be delamination resistant under such time-temperature conditions. Additionally, the packaging material should be heat shrinkable under pasteurizing conditions so as to provide an attractively packaged pasteurized food product.

The term "cook-in" as used herein is intended to refer to packaging material structurally capable of withstanding exposure to cook-in time-temperature conditions while containing a food product. Cook-in packaged foods are essentially pre-packaged, pre-cooked foods that go directly to the consumer in that configuration which may be consumed with or without warming. Cook-in time-temperature conditions typically refer to a long slow cook, for example submersion in water at 70°–80° C. for 4–6 hours. Such cook-in time-temperature requirements are representative of institutional cooking requirements. Submersion at 80° C. for 12 hours probably represents the limiting case. Under such conditions, a packaging material properly characterized as cook-in will maintain seal integrity and will be delamination resistant. Additionally, the packaging film should be heat shrinkable under these conditions so as to form a tightly fitting package and preferably should have some tendency for product adhesion to prevent "cook-out" or collection of juices between the surface of the food product and the interior surface of the packaging material.

The term "ethylene alkyl acrylate copolymer" (EAA) is used herein to define a copolymer formed from ethylene and alkyl acrylate comonomers wherein the ethylene derived units in the copolymer are present in major amounts, and the alkyl groups may include e.g. ethyl, methyl and butyl groups.

Generalizing, there are a number of requirements for a pasteurizable, cook-in packaging material. It is the purpose of the present invention to provide a pasteurizable, cook-in packaging film meeting all of these requirements. First, bags made from such film must have seal integrity under such conditions, i.e. the heat sealed seams should resist being pulled apart during heat shrinking. As a corollary, the film should be heat sealable to itself. Second, such bags must be delamination resistant, i.e. the multilayers making up the film must not separate or blister. Third, the food contact layer of such film must qualify under the appropriate food laws and regulations for safe food contact. Fourth, the film must provide an oxygen and vapor barrier, i.e. must possess a low permeability to maintain the freshness of the food contained therein. Fifth, the film must be heat shrinkable in hot water under these time-temperature conditions, i.e. the film must possess sufficient shrink energy such that upon the packaged food product being submerged in hot water the packaging film will shrink snugly around the product contained therein, representatively about 30–50% biaxial shrinkage at about 90° C. Sixth, the film should possess optical clarity, i.e. the film should not become cloudy upon exposure to these time-temperature conditions so as to maintain eye appeal of the packaged product.

In general, such a multilayer film structure will have the minimal structure (sealing and food contact layer)/(shrink layer)/(barrier layer)/(abuse layer), a composite structure being required to achieve the desired composite properties of the packaging film.

A heat shrinkable, thermoplastic, barrier packaging film for making bags which has enjoyed considerable commercial success is described in U.S. Pat. No. 3,741,253 issued on June 26, 1973 to Brax et al, which relates to a multilayer film comprising a first outside layer of an irradiated ethylene-vinyl acetate copolymer, a core layer of vinylidene chloride copolymer, and a second outside layer of an ethylene-vinyl acetate copolymer. In manufacturing this type of heat shrinkable film, a tubular orientation process is utilized wherein a primary tube of the film is biaxially oriented by stretching with internal pressure in the transverse direction and with the use of pinch rolls at different speeds in the machine direction. Then the bubble is collapsed, and the film is wound up as flattened, seamless, tubular film to be used later to make bags, e.g. either end-seal bags typically made by transversely heat sealing across the width of flattened tubing followed by severing the tubing so that the transverse seal forms the bottom of a bag, or side-seal bags in which the transverse seals form the bag sides and one edge of the tubing forms the bag bottom.

This type of bag is typically used by placing the food product in the bag, evacuating the bag, gathering and applying a metal clip around the gathered mouth of the bag to form a hermetic seal, and then immersing the bag in a hot water bath at approximately the same temperature at which the film was stretch-oriented, typically about 160° to 205° F., hot water immersion being one of the quickest and most economical means of transferring sufficient heat to the film to shrink it uniformly. Alternatively, the bag may serve as a liner of a cooking mold. One problem which has been encountered is the failure of the bag seals at the bottom of the bags as the bag is shrunk around a product, the shrink forces tending to pull the seal apart.

Of interest is U.S. Pat. No. 4,469,742 directed to pasteurizable, cook-in shrink film having six layers, the second or shrink layer comprising a cross-linked ethylene homopolymer or copolymer, and having a sealant layer of a nonlipophillic material such as polypropylene or ionomer.

Of general interest concerning the present invention, is the disclosure of U.S. Pat. No. 4,352,702 for "Method of Making a Thermoplastic Receptacle Having Improved High Temperature Seal" issued Oct. 5, 1982 to Bornstein, being directed to a pasteurizable shrink bag from tubular film having a layer of hydrolyzed ethylene-vinyl acetate copolymer and an interior surface layer of a polyolefin which is cross-linkable by ionizing radiation, with the layers being directly melt-joined without an adhesive disposed therebetween and the film being irradiatively cross-linked and oriented. A second irradiation treatment is carried out on receptacles made from the film to condition their heat seals for pasteurizing conditions.

Also of interest is U.S. Pat. No. 4,424,243 issued to Nishimoto et al and disclosing a multilayer film having outer surface layers of linear low density polyethylene or a blend of this linear polyethylene with alphaolefin polymers such as ethylene alkyl acrylate copolymers. Thermoplastics resins used as adhesive layers include ethylene alkyl acrylates having 1 to 6 carbon atoms in the alkyl group.

Of general interest is the disclosure of U.S. Pat. No. 4,064,296 for "Heat Shrinkable Multilayer Film of Hydrolyzed Ethylene-Vinyl Acetate and a Cross-linked Olefin Polymer" issued Dec. 20, 1977 to Bornstein et al, being directed to a coextruded tubular film having a layer of hydrolyzed ethylene-vinyl acetate copolymer layer between two other polymeric layers at least one of which being irradiatively cross-linkable, the film being irradiated and oriented.

Of general interest is the disclosure of U.S. Pat. No. 3,595,740 for "Hydrolyzed Ethylene-Vinyl Acetate Copolymer as Oxygen Barrier Layer" issued July 27, 1971 to Gerow, being directed to oxygen barrier films having an interior barrier layer of a melt extrudable hydrolyzed ethylene-vinyl acetate copolymer and a heat sealing layer of an ethylene polymer or copolymer.

Of general interest is the disclosure of U.S. Pat. No. 4,233,367 for "Coextruded Multilayer Film" issued Nov. 11, 1980 to Ticknor et al, being directed to a coextruded multilayer film having adhesive interlayers of a chemically modified polyolefin, such as Plexar TM adhesive, with functional groups selected for their strong affinity for nylon under heat and pressure conditions of coextrusion.

Of general interest is the disclosure of U.S. Pat. No. 4,276,330 for "Trilaminate Film For Forming Sideweld Bags" issued June 30, 1981 to Stanley et al, being directed to sideweld bags made from trilaminate film having a core layer of propylene-ethylene block copolymer between surface layers of propylene-ethylene random copolymer.

SUMMARY OF THE INVENTION

In accordance with the present invention, a multilayer shrink film comprises a first or sealing layer comprising a polymeric material selected from the group consisting of sealing material that does not cross-link in the presence of ionizing radiation, and a sealing material that undergoes adhering surface treatment in the presence of ionizing radiation to impart a tendency for adherence to a contained meat product during cook-in; a second shrink layer, melt bonded to said first layer; a third adhesive layer, melt bonded to said second layer, comprising a chemically modified ethylene alkyl acrylate or ethylene vinyl acetate copolymer; a fourth or barrier layer, melt bonded to said third layer, comprising an ethylene vinyl alcohol copolymer; a fifth adhesive layer as in said third layer, melt bonded to said fourth layer; and a sixth or abuse layer, melt bonded to said fifth layer; wherein ethylene alkyl acrylate is present in either the adhesive layers, or in the shrink and abuse layers.

Additionally, there is provided a method for making a multilayer shrink film comprising fully coextruding a tubular multilayer film having the foregoing composite structure; cooling the film; raising the temperature of the film to its orientation temperature range; and orienting the film.

DESCRIPTION OF THE PREFERRED EMBODIMENTS

A representative embodiment of the invention is a composite tubular film having the multilayer structure (inside) A/B/C/D/C/E (outside) where A is primarily a heat sealing layer, B is primarily a shrink layer, C is primarily an adhesive layer, D is primarily a barrier layer, and E is primarily an abuse layer. A tubular film configuration is especially suited for bag making. The seal material of layer A is nonlipophillic, i.e. relatively resistant to degradation in the presence of grease, so that seal integrity of bags made from the film is maintained during cook-in conditions and has a softening point greater than that of the shrink layer B so that during heat shrinkage of a bag made from the film about a contained food product the bag seals are not softened.

There are two general modes in selecting the sealing layer, the first being directed to a sealing material that does not cross-link in the presence of ionizing radiation, and the second being directed to a sealing material that undergoes adhering surface treatment in the presence of ionizing radiation to impart a tendency for adherence to a contained meat product during cook-in. In the first mode, the sealing layer is representatively a propylene-ethylene random copolymer having a minor amount of ethylene, representatively about 1-6%. In the second mode, the sealing material is for example an ionomer, representatively Surlyn TM from the Du Pont Company, or a blend of an ionomer with a linear low density polyethylene.

The second layer, being a shrink layer, is melt bonded to the first layer and is composed of a blend of a linear low density polyethylene and an ethylene alkyl acrylate or ethylene vinyl acetate copolymer. The term "shrink layer" is intended to refer to the shrink controlling layer that initiates compatible shrinkage of the overall multilayer structure. The relative thickness of the shrink layer is selected as being sufficient relative to that of the overall film thickness such that the shrink temperature of the shrink layer controls the shrinkage of the entire multilayer film, when oriented. The ethylene alkyl acrylate copolymer is the preferred blending material.

More preferably, the ethylene alkyl acrylate copolymer component of the blend layer is an ethylene butyl acrylate such as Norchem DNBA 714. This material has a density at 23° C. of about 0.921 grams per cubic centimeter (ASTM D1505) and a melt index of about 3.2 grams per 10 minutes (ASTM D1238).

Barrier layer D is composed of an ethylene vinyl alcohol copolymer (EVOH) and, importantly, is not degraded during irradiative cross-linking of the tubular film.

Adhesive interlayers C are melt bonded adjacent the barrier layer to provide delamination resistance of the barrier layer in the tubular film under pasteurizing or cook-in conditions.

In the past, layer adhesion between adhesives and EVOH has often proved inadequate in oriented structures. This is particularly evident in applications involving a cook-in or pasteurizing step where elevated temperatures and high humidity conditions may effect the interlayer adhesion of a multilayer film or bag. Base resins in adhesives such as ethylene alkyl acrylate copolymers can be extruded at significantly higher temperatures than ethylene vinyl acetate based adhesives, thus giving higher levels of adhesion. Typical extrusion temperatures for an acrylate adhesive are 500° F., compared with optimum extrusion temperatures of not greater than 400° F. for EVA based adhesives.

Thus, while ethylene vinyl acetate-based chemically modified adhesives are suitable for use in the present invention, it is advantageous to use an ethylene alkyl acrylate-based adhesive, such as ethylene methyl acrylate (EMA) and ethylene ethyl acrylate (EEA) and particularly ethylene butyl acrylate copolymer (EBA), as the adhesive. This is especially advantageous when pasteurizing/cook-in applications are involved, with stringent requirements for delamination resistance in elevated heat and humidity conditions.

Abuse layer E isolates the barrier layer from adverse moisture contact and representatively is a blend of a linear low density polyethylene (LLDPE) and ethylene alkyl acrylate or ethylene vinyl acetate copolymer, more preferably an ethylene butyl acrylate copolymer.

Abuse layer E and shrink layer B thus both preferably comprise a blend of a linear low density polyethylene and an ethylene alkyl acrylate copolymer. In each layer, the preferable alkyl acrylate is butyl acrylate. More preferably, each of the blend components comprises between about 20% and about 80% by weight of the blend layer. Although the specific range of each blend component i.e. the specific amount by weight of linear low density polyethylene and ethylene copolymer in each of blend layers B and E may be the same, it is not necessary that the blend layers be identical. For example, shrink layer B may comprise 20% by weight linear low density polyethylene and 80% by weight ethylene copolymer, while, in the same structure, the abuse layer E comprises about 80% by weight linear low density polyethylene and 20% by weight ethylene copolymer.

EVA and EMA are soft resins which are easier to orient than stiffer materials such as LLDPE. EMA and other ethylene alkyl acrylates are more preferred than EVA because of their hotter extrusion temperatures.

All layers within the film are melt bonded to their respective adjacent layers by virtue of full coextrusion after which the entire multilayer film can be subjected to ionizing radiation treatment. Representatively, the film will have an overall thickness prior to orientation of about 10-30 mils, seal layer A will have a thickness of about 2-6 mils, shrink layer B about 4-8 mils, adhesive layers C about 0.25-1 mil each, barrier layer D about 0.75-2 mils, and abuse layer E about 3-8 mils.

The tubular film of the invention can be made by a process similar to that described for the Brax patent, cited above, further provided that the tubular film is fully coextruded, i.e. all layers are simultaneously coextruded, using the conventional blown bubble technique.

After cooling, the coextruded tube is flattened and then may optionally be guided through an ionizing radiation field, for example through the beam of an electron accelerator to receive a radiation dosage in the range of about 3-12 megarads (MR). Irradiation by electrons to cross-link the molecules of polymeric material is conventional in the art. Radiation dosages are referred to herein in terms of the radiation unit "rad", with one million rads or a megarad being designated as "MR". The degree of molecular cross-linking is expressed in terms of the radiation dosage that includes the cross-linking. In general, irradiation should be sufficient to cross-link the irradiatively cross-linkable layers of the film to increase strength of the shrink layer without substantially diminishing elongation properties, and to provide delamination resistance of the film during pasteurizing or cook-in conditions. Cross-linking of the film by irradiation or other means such as chemical cross-linking is optional depending on the end uses of the multilayer film, but is necessary for film exposed to pasteurizing or cook-in conditions.

The tubular film is then cooled and collapsed after which it is fed into a hot water tank having water at about 190°-205° F. to soften the film for orientation; then it passes through pinch rolls and is inflated into a bubble and stretched to a point where the film thickness is representatively 2 mils. Suitable thickness will range from about 1-4 mils with a stretch ratio between about 5:1 and 15:1, which will impart a shrink capacity of about 30-55% biaxial free shrinkage at 185° F. (by ASTM D2732). As the bubble emerges from the hot water tank it cools rapidly in the air and then is collapsed and rolled up into flattened tubing. It is from this tubing of this final oriented thickness that bags can be made as discussed above.

Since the barrier layer of EVOH is not degraded during radiation treatment of the entire multilayer film, the film may be fully coextruded. Full coextrusion is advantageous in that all layers of the multilayer film are directly melt joined for enhanced interlayer strength under pasteurizing or cook-in conditions. Interlayer strength is further enhanced by the use of the ethylene alkyl acrylate copolymers in the blend layers B and E, and as chemically modified adhesives in the third and fifth adhesive layers of the film. It is therefore preferred that ethylene alkyl acrylate copolymer is used either in the adhesive layers, or in the blend layers B & E. More preferably, ethylene alkyl acrylates are used in all of these layers, i.e. in layers B, C, and E.

In use, bags can be made from the film of the invention in conventional manner, as discussed above, to form either end-seal or side-seal bags. Eventually, the bags can be loaded with a food product, vacuumized and sealed, and subjected to pasteurizing or cook-in treatment in near boiling water. During this food treatment, bags maintain good seal integrity, do not delaminate, and heat shrink to form a neatly packaged pretreated food product.

In one preferred embodiment of the invention, the sealing layer is composed of a propylene-ethylene random copolymer (PER) which does not cross-link or observably degrade or consequently lose its sealing properties if irradiated with electrons during radiation treatment of the fully coextruded tubular film. It is essential that the propylene-ethylene copolymer of the sealing layer be a random copolymer. The term "random polymer" is used in the conventional sense to refer to a copolymer consisting of alternating segments of two monomeric units of random lengths, including single molecules. The purpose of this limitation is that the sealing range of polypropylene is broadened to overlap the working temperature range of the shrink layer, but at the same time does not create a tendency of the propylene copolymer to cross-link in the presence of radiation which would unacceptably increase the viscosity of the sealing layer material during sealing and hinder formation of a completely fused seal. Another way of viewing this effect, is that as the randomness of the propylene-ethylene copolymer increases, crystallinity decreases thereby broadening the melt range for the random copolymer. Thus, in general the minor amount of ethylene added to randomize the copolymer will range from a lower ethylene content that is sufficient to disrupt crystallinity to the extent that the melt range of the random copolymer is sufficiently broadened to encompass ranges somewhat below that of boiling water, while the upper limit for the ethylene content is limited by the extent of randomness desired in that as ethylene content increases copolymerization will become generally less random and more of the block type, the block configuration tending to promote crystallinity (block alignment) and cross-linking in irradiation fields. Commercially available propylene-ethylene random copolymers are generally available with ethylene contents of about 1-6% and may be available up to 10% to a lesser extent. A representative random copolymer within the scope of the invention may be typically characterized as having a randomness index of roughly 0.5, as determined by the methodology disclosed in U.S. Pat. No. 4,325,365, a bulk density at 23° C. of about 0.9 grams/cc by ASTM D 1895-69 method C, a melt flow at 190° C. of about 1.7 grams/10 minutes by ASTM D1238, an ethylene content of about 5% by Perkin-Elmer infrared spectrophotometer standards, and a melting temperature of about 136° C.

In another mode, when adhesion of the inner surface of a bag made from the film of the invention to a contained food product during cook-in is desired, the material of the sealing layer is an ionomer that is responsive to an energetic adhering surface treatment such as exposure to ionizing radiation. Representatively, such a material is available from DuPont under the trademark Surlyn which refers to metal salt neutralized copolymers of ethylene and acrylic acid or methacrylic acid. In certain applications, it is advantageous that a cook-in package adhere to the contained food product to prevent cook-out, i.e. exudation of fluids from the food product during cooking. By restricting exudation of fluids from a cook-in contained food product, the yield of the precooked food product is increased by fluid retention. In this mode, when the multilayer film is subjected to radiation treatment for cross-linking, the inner surface of the Surlyn layer is consequently giving an adhering surface treatment. The inclusion of Surlyn in the multilayer film may limit service use to cook-in conditions.

In still another mode, the material of the sealing layer is a blend of a linear low density polyethylene with ether an ionomer such as Surlyn, or an ethylene acrylic acid copolymer such as Primacor available from Dow Chemical Company or Nucrel available from Du Pont Company.

The barrier layer is composed of hydrolyzed ethylene-vinyl acetate copolymer, preferably hydrolyzed to at least about 50%, most preferably to greater than about 99%. The mole percent of vinyl acetate prior to hydrolysis should be at least about 29% since for lesser amounts the effectiveness of the hydrolyzed copolymer as a gas barrier is substantially diminished. It is further preferred that the EVOH copolymer have a melt flow being generally compatible with that of the other components of the multilayer film, preferably in the range of 3-20, more preferably in the range of about 3-10 (melt flow being determined generally in accordance with ASTM D1238). The gas of main concern is oxygen and transmission is considered to be sufficiently low, i.e. the material is relatively gas impermeable, when the transmission rate is below 70 cc/m$^2$/mil thickness/24 hrs./atms, as measured according to the procedures of ASTM Method D-1434. The multilayer film of the present invention has a transmission rate below this value. EVOH is advantageously utilized in the film of the invention since irradiative treatment of the fully coextruded film does not degrade the barrier layer, as would be the case for a vinylidene chloride-vinyl chloride copolymer (saran) barrier.

The present invention may be further understood by reference to specific proposed examples described below.

EXAMPLE NO. 1

A six layer structure is coextruded in a tubular form. The first sealing layer is an ionomer or a propylene ethylene copolymer. The second and sixth layers comprise between 20 and 80% LLDPE and between 80 and 20% EVA. The third and fifth layers are tie layers selected from the acrylate copolymers such as EMA, EEA, and EBA. The fourth layer comprises an ethylene vinyl alcohol copolymer as barrier material. Immediately after coextrusion, the tubular film is quenched with cold water. The tube is optionally irradiated with ionozing radiation to cross-link some or all of the six layers. The tube is then oriented using a hot water heating system to a total orientation ranging from 5 to 1 up to 15 to 1 (in each of the transverse and longitudinal directions). Typical extrusion temperatures for an acrylate adhesive are about 500° F.

EXAMPLE NO. 2

A film similar to that of example 1 is produced, by similar methods, except that an ethylene alkyl acrylate copolymer is used instead of the EVA of the second and sixth layers, and an EVA based adhesive is used in the tie layers in lieu of the acrylate adhesive material of example 1.

EXAMPLE NO. 3

A film similar to that of examples 1 and 2 is produced by similar methodology, and having ethylene alkyl acrylate copolymer as the blending material of the second and sixth layers, and as the adhesive of the third and fifth layers of the coextruded film.

Although the present invention has been described in conjunction with preferred embodiments, it is to be understood that modifications and variations may be utilized without departing from the principles and scope of the invention, as those skilled in the art will readily understand. Accordingly, such modifications and variations may be practices within the scope of the following claims.

What is claimed is:

1. A multilayer shrink film, comprising:
   (a) a first or sealing layer comprising a polymeric material selected from the group consisting of a propylene ethylene copolymer, an ionomer, a blend of a linear low density polyethylene and an ionomer, and a blend of a linear low density polyethylene and an ethylene acrylic acid copolymer;
   (b) a second shrink layer, melt bonded to said first layer;
   (c) a third adhesive layer, melt bonded to said second layer, which comprises a chemically modified ethylene alkyl acrylate copolymer or ethylene vinyl acetate copolymer;
   (d) a fourth barrier layer, melt bonded to said third layer, which comprises an ethylene vinyl alcohol copolymer;
   (e) a fifth adhesive layer as in said third layer, melt bonded to said fourth layer; and
   (f) a sixth abuse layer, melt bonded to said fifth layer;
   wherein ethylene alkyl acrylate copolymer is present in either the adhesive layers, or as a component blended with linear low density polyethylene in the shrink and abuse layers; and
   wherein the second and sixth layers comprise a blend of a linear low density polyethylene and a polymeric material selected from the group consisting of ethylene alkyl acrylate copolymer and ethylene vinyl acetate copolymer.

2. The film of claim 1 wherein said ethylene alkyl acrylate copolymer comprises ethylene butyl acrylate copolymer.

3. The film of claim 1 wherein the film is cross-linked by irradiation at a dosage sufficient to render the film delamination resistant under cook-in conditions.

4. The film of claim 1 where the film is cross-linked by irradiation at a dosage of between about 3 and about 12 megarads.

5. The film of claim 1 wherein said second and sixth layers comprises between about 20% and 80% by weight of a linear low density polyethylene, and between about 20% and 80% by weight of an ethylene alkyl acrylate copolymer.

6. The film of claim 1 wherein said film is oriented.

7. The film of claim 8 wherein said film is biaxially oriented to a stretch ratio of between about 5 to 1 and 15 to 1.

8. The film of claim 1 wherein said first layer comprises a propylene-ethylene random copolymer having an ethylene content of about 1–6% by weight.

9. The film of claim 1 wherein the film is chemically cross-linked.

* * * * *